United States Patent Office 3,819,659
Patented June 25, 1974

3,819,659
TRIMELLITIC ACID ANHYDRIDE RECOVERY FROM LIQUID PHASE OXIDATION OF PSEUDOCUMENE
Richard H. Baldwin, Oak Lawn, Donald E. Burney, Naperville, and Philip H. Towle, Lombard, Ill., and Donald G. Micklewright, Broadview Heights, Ohio, assignors to Standard Oil Company, Chicago, Ill.
No Drawing. Filed Aug. 27, 1971, Ser. No. 175,696
Int. Cl. C07c 63/32
U.S. Cl. 260—346.4
7 Claims

ABSTRACT OF THE DISCLOSURE

Substantially all trimellitic acid equivalent as its acid anhydride (intra-molecular anhydride) is recovered from effluent from liquid phase oxidation of pseudocumene (1,2,4-trimethylbenzene) by crystallizing acid anhydride from a ketone or an aromatic hydrocarbon solution of a mixture of partially purified acid anhydride and materials boiling lower than said acid anhydride obtained as an overhead fraction from flash distillation of total oxidation effluent whose trimellitic acid content has been thermally converted to crude acid anhydride. Such processing of oxidation effluent avoids subjecting oxidation effluent to crystallization, which leaves up to 35% or more trimellitic acid as solute in mother liquor requiring separate recovery of trimellitic acid from mother liquor, and processing of mother liquor to recover a portion of said solute to effect more efficient recovery of total trimellitic acid content of oxidation effluent.

BACKGROUND OF INVENTION

Pseudocumene can be oxidized to trimellitic acid under liquid phase conditions with nitric acid or with a source of molecular oxygen (e.g. oxygen gas or air) in the presence of acetic acid and catalysis provided by heavy metal oxidation catalyst (e.g. cobalt, manganese, cerium and mixtures thereof) and a side chain oxidation promoter such as a source of bromine. In such oxidations the resulting trimellitic acid substantially dissolved in the aqueous or acetic acid reaction medium is recovered by physical means such as crystallization followed by filtration, or by extraction, or as a residue from evaporation or distillation of the reaction medium from the oxidation effluent. Such preparations and recoveries of trimellitic acid are taught in U.S. Pat. No. 2,971,011. This patent also teaches that such recovered trimellitic acid is contaminated with oxidation by-products including yellow to tan materials, tar-like materials, catalyst metals and bromine. This patent further teaches that such contaminated crude trimellitic acid can be recovered as its relatively pure acid anhydride by subjecting the crude acid to dehydration in the presence of a moving inert gas at a temperature between 170 and 250° C. to form a crude acid anhydride, selectively extracting a partially purified acid anhydride from said crude anhydride with benzene or normally liquid alkylbenzene (e.g. toluene, xylene and pseudocumene) boiling in the range of 110 to 230° C., treating the extract solution with decolorizing adsorbent (e.g. activated carbon), removing the adsorbent, and crystallizing trimellitic acid anhydride (TMA) from the decolorized solution by cooling or evaporation of the solvent. Recovered TMA amounts to 83–91 mole percent of the crude trimellitic acid but contains catalyst metals and bromine.

Crude trimellitic acid recovery from oxidation effluent containing acetic acid reaction solvent by crystallizing and separating the tricarboxylic acid at 38° C., while commercially feasible, leaves a substantial amount of the tricarboxylic acid dissolved in the acetic acid mother liquor. For example, when oxidation effluent containing 40 weight parts trimellitic acid per 100 weight parts acetic acid is cooled to 38° C. and crystallized only a portion of the trimellitic acid is separated, the resulting acetic acid mother liquor contains 32.5% of the originally produced trimellitic acid. Concentration of the mother liquor by removing 50% of the acetic acid, cooling the concentrate to 38° C. and separating a second crop of trimellitic acid leaves 15–17% of the trimellitic acid dissolved in the secondary mother liquor.

U.S. Pat. No. 3,161,658 teaches treating such acetic acid mother liquors containing dissolved trimellitic acid to recover 65–67% of the solute as crude TMA. This is done by charging the acetic acid mother liquor into a melt of TMA to drive off the solvent and convert trimellitic acid to crude TMA. A portion of the TMA melt is withdrawn and selectively extracted with a methyl ketone or aromatic hydrocarbon solvent. The extract solution is separated from insolubles. The solvent is removed from the solution by evaporation or distillation leaving partially purified TMA which is combined with crystallized trimellitic acid first recovered from reaction effluent, preferably after conversion of the tricarboxylic acid to TMA and the combined crude TMA is fractionated.

U.S. Pat. No. 3,261,846 provides another approach for increasing recovery of TMA from the trimellitic acid content of the oxidation effluent also containing aqueous acetic acid reaction medium. This approach first removes water and acetic acid from the effluent by distillation in the presence of added pseudocumene and a small amount of strong mineral acid. When the amount of pseudocumene added is just sufficient to remove water as a pseudocumene-water phase, an acetic acid concentrate (95–100% acetic acid) is next distilled off leaving a residue of crude trimellitic acid for recovery by its dehydration to crude TMA and the fractionation thereof for TMA product recovery. When pseudocumene is added in excess over that required to remove water, the pseudocumene-water phase is distilled out as before and the acetic acid concentrate can be completely distilled out leaving a residue composed of a mixture of crude trimellitic acid and pseudocumene. This mixture can be heated to a temperature at which crude trimellitic acid is dehydrated to crude TMA and the water produced thereby is removed as a pseudocumene-water phase. The hot residue is a solution of crude TMA with some insoluble materials. Insolubles are removed by filtration of the hot residue. The hot filtrate, a solution of TMA, is recovered and cooled to 25° C. to crystallize partially purified TMA. The partially purified TMA is recovered by filtration and washed with pentane. The washed, partially purified TMA is melted and the melt fractionated to recover TMA product. Pentane washing is taught to be necessary to remove pseudocumene which would, if not removed, distill with product TMA and contaminate it.

The latter two prior recovery techniques require a final fractionation to obtain desired acid anhydride product free from contaminants. The first prior technique leaves some metal contaminants in the final acid anhydride product and makes use of decolorizing adsorbent. There are other processing drawbacks in those prior acid anhydride techniques which are readily apparent to those skilled in this art.

The present inventive process eliminates crystallization of oxidation effluent, high vacuum fractionation, use of color adsorbent and retention of metal contaminants in the final TMA product and still provides a commercially feasible process.

SUMMARY OF THE INVENTION

The present inventive process starts with the total crude TMA present in oxidation effluent, i.e. crude TMA after removal of reaction medium from pseudocumene oxidation effluent and conversion of the trimellitic acid content thereof to TMA. The total crude TMA is flash distilled at subatmospheric pressure, preferably aided by steam distillation, to remove as overhead fraction a mixture of substantially all trimellitic acid anhydride and organic chemical materials boiling below TMA leaving as a residue fraction materials boiling higher than TMA. Such organic overhead fraction is extracted with an organic solvent which is inert to TMA and selectively dissolves it. Ketones containing at least one methyl-substituent on the keto-carbonyl group and aromatic hydrocarbons, benzene and alkylbenzenes normally liquid and boiling from 110° C. (toluene) to 230° C. (pseudocumene) are preferred as such inert selective solvents. It is preferred to use the solvent in the minimum amount required under the temperature of extraction to form a solution substantially saturated with TMA. The extract solution is recovered from insolubles by any means for separating liquids and solids and is cooled to crystallize trimellitic acid anhydride. Crystalline TMA product is separated from the solvent mother liquor.

The foregoing process does not carry metallic contaminants (from oxidation catalyst and/or corroded metals) through to the recovered crystalline TMA product because the metals are trimellitates or other high boiling forms are in the residue fraction from the vacuum flash distillation. Other high boiling contaminants which are oxidation by-products and co-products, although insoluble for the most part in the selective extracting solvent but present some difficulty in the separation of the solution of acid anhydride are also eliminated in the residue fraction from vacuum flash distillation. The insolubles separated from the extract solution prior to crystallization of TMA product comprise mainly the low boilers but include trimellitic acid not converted to TMA, isophthalic acid and terephthalic acid (the latter two from disproportionation of pseudocumene during its oxidation) all of which can be entrained with TMA in the overhead fraction from vacuum flash distillation.

The starting crude TMA amounts to total oxidation effluent solids equivalent after the removal of reaction medium from oxidation effluent and conversion of its trimellitic acid content to the acid anhydride. Removal of the reaction medium from pseudocumene oxidation effluent to obtain its total solids can be accomplished by evaporation or distillation conducted in one, two or three or more steps any one of which can include thermal conversion to TMA of the trimellitic acid content of such total solids. Also the conversion to crude TMA can be conducted as a separate step according to the procedures which follow. When the reaction medium is substantially water (e.g. from nitric acid oxidation), distillative or evaporative removal of the water generally will not involve sufficiently high (170° C. and above) temperature for said conversion of trimellitic acid to TMA and such conversion is conducted as a separate step. When the reaction medium is substantially acetic acid (70-95% acetic acid and 30-5% water), removal of the acetic acid reaction medium can be partially or completely accomplished by evaporative or distillative means. Partial evaporation or distillation of the acetic acid reaction medium can be used as a means for making use of sensible heat in the oxidation effluent which is at an elevated temperature and pressure, for example a temperature of 160 to 235° C. and a guage pressure of 300-500 pounds per square inch (p.s.i.g.). Evaporation of a mixture of vapors of water and acetic acid by depressurizing such effluent to a lower pressure, 40 to 0 p.s.i.g. effects cooling to about 120-140° C. For example depressuring from 325 p.s.i.g. to 40 p.s.i.g. will effect cooling from 205° C. to 135° C. Then additional acetic acid can be removed by distillation (positive heat input) to obtain a pumpable slurry of solids. This slurry can be charged to a molten crude TMA (165-233° C.) to drive off the remaining acetic acid and the water from conversion of the crude trimellitic acid to crude TMA. In addition, the concentrated oxidation effluent from evaporation by sensible heat or the total oxidation effluent can be charged to the molten crude TMA to effect removal of reaction medium and convert the trimellitic acid content of total solids in the oxidation effluent to crude TMA. The pumpable slurry from distillation of oxidation concentrate described above can be separately heated to drive off residual acetic acid and then further heated with inert gas sweep or at reduced pressure to convert the trimellitic acid to obtain crude TMA starting material. It is preferred to convert the trimellitic acid content of the reaction effluent to crude TMA through one of the foregoing uses of the molten crude TMA because this provide a fluid crude TMA feed for the vacuum flash distillation step.

Vacuum flash distillation can be conveniently conducted at a pressure in the range of 500 to 10 mm. Hg and at the corresponding temperature within the range of 370 to 240° C. Preferably, TMA volatization is conducted at 10 to 100 mm. Hg pressure and 240 to 305° C. aided by steam distillation to avoid decarboxylation, conversion of TMA to its bis-anhydride (intermolecular anhydride of two molecules of TMA), to enhance maximum distillation of TMA acid anhydride and provide a flowable residue. For such a steam distillation-aided vacuum distillation, the total overhead fraction, i.e. mixture of steam, TMA vapors, vapors of organic chemical compounds boiling below TMA and the entrained benzene carboxylic acids, is cooled by a hot condenser to a temperature at which TMA and materials boiling below TMA are condensed as a liquid at the reduced pressure of operation. In this manner condensation of steam and separation of organics from aqueous condensate are avoided. The vapors from the hot condenser, mainly steam, are condensed by a water cooled condenser and the aqueous condensate discarded. The amount of steam used to aid the vacuum distillations is not critical because all the steam used passes through the hot condenser and will not hydrolyze TMA back to the tricarboxylic acid. The partially purified TMA is collected as a liquid condensate from either vacuum distillation or steam aided vacuum distillation under the pressure conditions of conducting such distillations. Thereafter liquid TMA condensate or a solidified TMA condensate can be extracted with the inert solvent.

The preferred extracting solvents are, as before stated, ketones containing at least one methyl group attached to the ketocarbonyl group or a benzene hydrocarbon including benzene and alkylbenzenes boiling between toluene and pseudocumene inclusive. Such ketones include acetone, methyl ethyl ketone, methyl propyl ketone, methyl isopropyl ketone, methyl butyl ketone and the like. Because of their appreciably high solvent capacity for trimellitic acid anhydride, acetone and methyl ethyl ketone are most preferred of the ketones. The benzene hydrocarbon solvents include benzene, toluene, ethylbenzene, isopropylbenzene, the individual xylene isomers, mixtures of xylene isomers including commercial mixed xylenes which also contain ethylbenzene, ethyltoluenes, diethylbenzenes, cymenes, pseudocumene and mesitylene. Commercial mixed xylenes dissolve on the basis of 100 grams thereof 11.6 to 65 grams TMA at temperatures in the range of 140-200° C. The solvent capacity of pseudocumene is of about the same magnitude. When pseudocumene is used as the extracting solvent, it is desirable to wash it from the recrystallized TMA product with a paraffinic hydrocarbon because high boiling pseudocumene adhering to the crystalline product is difficult to remove by feasible drying conditions short of melting the TMA product. Normally liquid paraffinic hydrocarbons do not dissolve TMA and hence are suitable for washing adhering pseudocumene from the crystalline product. Such paraffinic hydrocarbons desirably include those having at least 5 carbon atoms and preferably are those boiling in the range of 35-175° C. because they can be readily evaporated under feasible drying conditions. Pentane, hexane and heptane are preferred for such washing purposes. Benzene hydrocarbons boiling below 145° C. do not, as selective extracting solvents, suffer the aforementioned disability of pseudocumene and are, therefore, preferred over pseudocumene.

The amount of benzene hydrocarbon or methyl ketone type extracting solvent to be used at any particular extracting temperature can be readily determined by simple TMA solubility tests when such solubility for a particular solvent has not been previously indicated or not illustrated in the following exemplification of the present invention. At any selected extraction temperature the amount of solvent used should be that amount which provides a solution substantially saturated with trimellitic acid anhydride at the selected temperature.

Recovery of the acid anhydride product from the extract solution is accomplished by first separating insolubles from such solution using any desired means, e.g. filtration, centrifugation, decantation and the like, for separating solids from liquids. Thereafter the separated solution can be subjected to evaporation or distillation to remove solvent and precipitate TMA product, or the separated solution can be cooled to precipitate TMA product or the separated solution can be subjected to both concentration and cooling to obtain crystallized TMA product. The crystallized TMA is recovered by any means for separating solid and liquid such as those mentioned above and the recovered crystalline product is dried, for example, in an oven or kiln drier at subatmospheric pressure or atmospheric pressure with or without the assistance of inert gas ($CO_2$, $N_2$, air, flue gas, etc.) sweep to remove adhering wash solvent. Solvent removed by drying, for best operating economics, is condensed and reused. The solvent from the evaporation or distillation which provided the concentrate for TMA crystalline precipitation is also recovered for reuse for the same economic reason. Solvent is distilled from separated mother liquor and recovered for reuse for good operating economics.

The following examples are illustrative of the present inventive process. In these examples the oxidation effluent used is from the air oxidation of pseudocumene under liquid phase conditions in the presence of acetic acid and catalysis provided by a source of bromine and cobalt, manganese, cerium or mixtures thereof at a temperature of 160–238° C. This effluent contains reaction medium of 85% acetic acid and 15% water (weight basis) and for each 100 parts of reaction medium, 36.3 parts of trimellitic acid, 1.18 parts of aromatic co- and by-products and 0.12 part metal compounds. This effluent is first flash evaporated from 205° C. and 325 p.s.i.g. to 140° C. and 39 p.s.i.g. to remove a mixture of vapors of water and acetic acid and then further evaporated at 60° C. and 115 mm. Hg to remove more acetic acid. The final concentrate is pumped into a molten pool of 250 pounds of trimellitic acid anhydride (TMA) temperature of 205° C., atmospheric pressure and at a feed rate to provide 133 pounds trimellitic acid per hour. Advantageously the molten TMA is contained in a heated vessel having a TMA reflux (hot) condenser operated at a temperature to condense TMA vapors and returning liquid TMA condensate to the pool. Vapors issuing from said TMA condenser are conducted through a condenser of side arm type to condense acetic acid condensate is transferred to acetic acid recovery. The incoming 133 pounds of crude trimellitic acid per hour with its before mentioned attendant impurities provides, on an hourly basis, 121.6 pounds TMA, 4.33 pounds co- and by-products and 0.44 pound metal compounds, or a total of 126.37 pounds crude TMA per hour.

EXAMPLES 1–3

Crude acid anhydride at 205° C. is withdrawn from the just described pool of molten crude TMA at the rate of 126.37 pounds per hour. The mixture is charged to a vacuum flash still operated at a pot temperature of 250° C. and an overhead pressure of 20 mm. Hg with injection of steam at 250° C. The organic overhead fraction is condensed at 180° C., amounts to 114.7 pounds per hour of partially purified TMA, contains 92% of TMA charged and has a TMA content of 97.8%. Steam is condensed by 38–40° C. water. The residue, 12.71 pounds per hour, is fluid and contains 76.5% TMA, the metals compounds and a part, about one-half, of the co- and by-products. This residue can be accumulated for catalyst metals recovery and/or secondary recovery of trimellitic acid. Such secondary TMA recovered can be added to the step of preparing crude TMA for processing according to this invention.

The partially purified TMA condensed at 180° C. is extracted with acetone, pseudocumene or commercial mixed xylenes as selective solvents in the following manner.

Example 1 extraction

The liquid (180° C.) condensate is solidified, cooled to 38° F. and ground. Acetone and the ground 97.8% TMA content solid are combined in the proportions of 2 pounds acetone per pound of said solid. The mixture is stirred at 38° C. for 50 minutes and then cooled to 25° C. The cooled slurry (insolubles are the impurities) is filtered and the filtrate is heated to evaporate acetone. The residue is TMA product. From 97.8% TMA overhead fraction there is obtained a TMA product of 99.2% purity. This TMA product can be melted and solidified in flake or briquette form.

Example 2 extraction

The liquid condensate at 180° C. is combined with pseudocumene in the proportions of 8 pounds peudocumene for each 3 pounds of condensate, stirred and heated to 175° C. for 20 minutes. The pseudocumene solution (304 pounds pseudocumene for 114.7 pounds of condensate) is separated from insolubles. The insolubles free solution is cooled to 25° C. to crystallize TMA product which is separated from mother liquor, washed with pentane to remove adhering mother liquor and then dried. The dried TMA product has a purity of 99.3%. The pseudocumene mother liquor is recycled for further extraction of 180° C. condensate. The wash liquor, a solution of mother liquor in pentane, is distilled to remove pentane, and the residue is recycled to the extraction step. The pentane recovered from said distillation and from both distillation and evaporation drying of crystalline product is reused for the pentane wash.

Example 3 extraction

The liquid 180° C. condensate and commercial mixed xylene heated to 180° C. are combined and mixed at 45 p.s.i.g. in the proportions of 100 pounds of xylene per 37 pounds of condensate, i.e. 310 pounds of xylene for 114.7 pounds of condensate. This mixture is held at 180° C. for 5 minutes, filtered at 45 p.s.i.g. to remove insolubles (2.60 pounds per 122 pounds of condensate). The filtrate is stirred and cooled to 20° C. in a crystallization vessel to crystallize TMA product. The crystalline TMA product is separated from mother liquor by filtration. The mother liquor filtrate is heated to 180° C. and 45 p.s.i.g. and recycled to extract more 180° C. partially purified TMA condensate. The separated crystalline TMA product is heated to remove xylene which is recovered and returned to the extraction step. Trimellitic acid anhydride product of 99% purity is recovered.

Oxidation effluent from other sources can be treated as described above to recover the total solids content of the effluent, convert to crude acid anhydride the trimellitic acid content of said total solids and then subject the crude acid anhydride to the process of this invention. Another source of such oxidation effluent is from the first oxidation of pseudocumene with air in the presence of acetic acid, cobalt acetate catalyst and methyl ethyl ketone promoter at 120–150° C. under liquid phase conditions to obtain a mixture of methylphthalic acids and dimethylbenzoic acids which are further oxidized by the addition of nitric acid. Still another suitable oxidation effluent is obtained by adding small amounts of pseudocumene to circulating dilute nitric acid containing cobalt oxidation catalyst until a trimellitic acid content of 2–2.5 weight percent is obtained.

The invention claimed is:

1. In the process for recovery of trimellitic acid anhydride from oxidation of pseudocumene under liquid phase conditions to produce an oxidation effluent containing trimellitic acid, co- and by-products and reaction medium, removing reaction medium from said effluent and heating the residue to convert its trimellitic acid content to crude acid anhydride; the improvement comprising vacuum flash distilling said crude acid anhydride at a pressure of 10–500 mm. Hg to remove as overhead fraction trimellitic acid anhydride and materials boiling below the acid anhydride, extracting said overhead fraction with a ketone having at least one methyl group attached to the keto-carbonyl group or benzene or an alkyl benzene boiling between 110 and 230° C., separating extract solution from insolubles and recovering trimellitic acid anhydride direct from the separated extract solution without fractionating said recovered anhydride.

2. The process of claim 1 wherein the vacuum flash distillation of acid anhydride is aided by steam distillation.

3. The process of claim 2 wherein the extract solvent is used in an amount to provide an extract solution substantially saturated with trimellitic acid anhydride.

4. The process of claim 3 wherein the extract solvent is acetone or methyl ethyl ketone.

5. The process of claim 3 wherein the extract solvent is xylene.

6. The process of claim 3 wherein the extract solvent is pseudocumene and the recovered trimellitic acid anhydride is washed with a $C_5$ to $C_{10}$ alkane hydrocarbon.

7. The process of claim 6 wherein the alkane hydrocarbon is pentane.

References Cited

UNITED STATES PATENTS

| | | | |
|---|---|---|---|
| 3,206,475 | 9/1965 | Malo | 260—346.3 |
| 3,161,658 | 12/1964 | Meyer | 260—346.3 |
| 3,261,846 | 7/1966 | Meyer | 260—346.3 X |

FOREIGN PATENTS

| | | | |
|---|---|---|---|
| 1,556,414 | 2/1969 | France | 260—346.4 |

JOHN D. RANDOLPH, Primary Examiner

B. DENTZ, Assistant Examiner

U.S. Cl. X.R.

260—346.3

PO-1050
(5/69)

UNITED STATES PATENT OFFICE
CERTIFICATE OF CORRECTION

Patent No. 3,819,659   Dated   June 25, 1974

Inventor(s) Richard H. Baldwin, Donald E. Burney, Philip H. Towle, and Donald G. Micklewright It is certified that error appears in the above-identified patent and that said Letters Patent are hereby corrected as shown below:

Column 3, Line 26   are should be as
Column 4, Line 15   provide should be provides
Column 5, Line 55   should read "(TMA) at a temperature" . . . .
Column 5, Line 63   line missing, should read: ". . . through a condenser of side arm type to condense acetic acid and water vapors for their removal from the vessel. The aqueous acetic acid condensate is transferred to acetic acid recovery."

Signed and sealed this 8th day of October 1974.

(SEAL)
Attest:

McCOY M. GIBSON JR.
Attesting Officer

C. MARSHALL DANN
Commissioner of Patents